Oct. 6, 1964  N. D. HAZZARD  3,151,667
SHIELDING ARRANGEMENT FOR TRUNNION
Filed Feb. 4, 1963
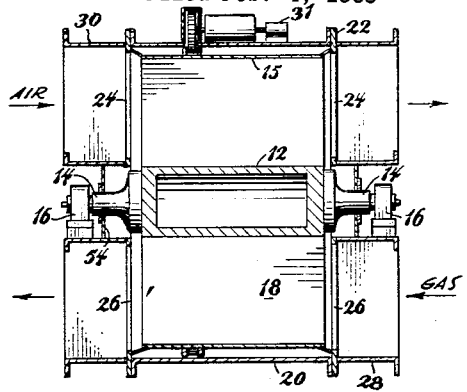
Fig. 1
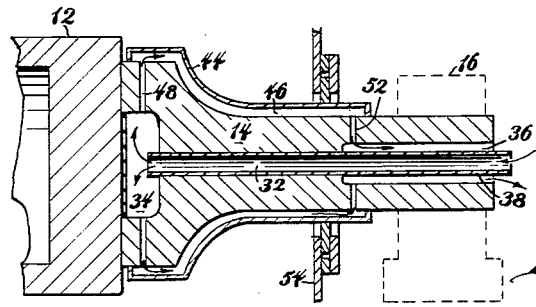
Fig. 2
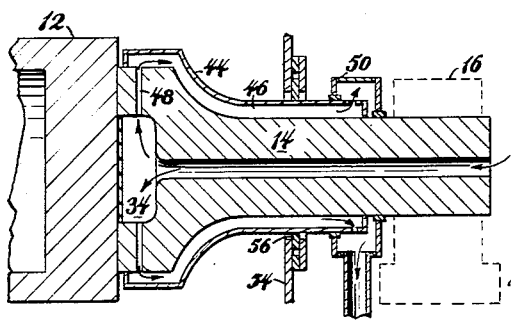
Fig. 3
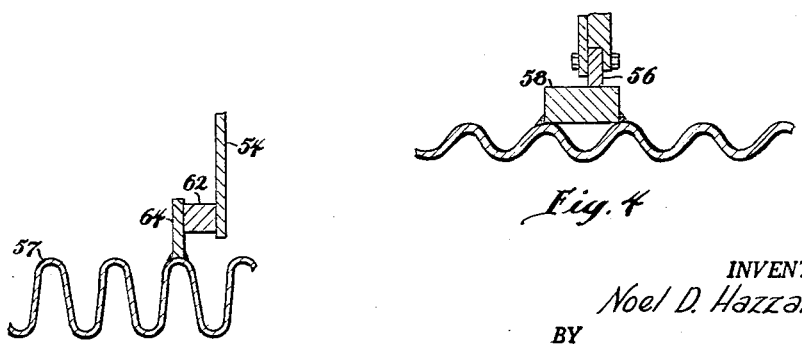
Fig. 4
Fig. 5
INVENTOR.
Noel D. Hazzard
BY
Wayne Lang
AGENT

3,151,667
SHIELDING ARRANGEMENT FOR TRUNNION
Noel D. Hazzard, Andover, N.Y., assignor to Combustion Engineering, Inc., New York, N.Y., a corporation of Delaware
Filed Feb. 4, 1963, Ser. No. 255,875
1 Claim. (Cl. 165—7)

This invention relates to support means for rotary apparatus and particularly to an arrangement for maintaining a low operating temperature in a support trunnion and bearing a rotary regenerative heat exchanger that is subjected to excessively high temperatures.

In rotary regenerative heat exchange apparatus of the type adapted for operation in high temperature zones, or in other zones subject to heat from an external source being radiated or conducted thereto, the trunnion and the support bearing are sometimes subjected to an excessive degree of heat that lowers the allowable stresses of the several parts so as to make necessary the use of more expensive heat resistant alloys, or a general strengthening of the parts to compensate for the lowering of the allowable stresses.

Cooling arrangements for the bearing have been adapted to circulate a coolant such as air, water or oil through passageways therein to effect a removal of the heat before critical heat levels are attained. However, an inherent fault with such an arrangement is that the trunnion must first absorb the heat before it may be transferred on to the bearing. When thus heated, the strength of the trunnion is itself subjected to a substantial reduction unless it has been constructed at a high cost from any of various high temperature alloys.

When the temperature ambient to the trunnion rises to or goes beyond 1000° F., the radiation becomes an increasingly great factor in the transfer of heat to the trunnion since the transfer of radiant heat increases by the fourth power of the temperature differential while the transfer of heat by convection increases only in direct proportion to the temperature increase.

Thus a substantial part of the heat being radiated to the trunnion from an external source may be precluded from reaching the trunnion by the proper use of a heat shielding arrangement. Other heat which reaches the trunnion by convection, or conduction from the rotor post may be removed therefrom by the judicious use of flow passageways in the trunnion and a cooling fluid for circulation therethrough.

This invention is therefore directed to an arrangement that maintains a low operating temperature within the trunnion and support bearing of a rotary regenerative heat exchanger. More particularly this invention relates to a combined external shielding and internal cooling arrangement for a rotor trunnion that substantially precludes the transfer of heat to the trunnion by either radiation or conduction.

The nature of the invention and the advantages resulting therefrom will be more clearly apparent from the succeeding detailed description of the invention and the accompanying drawings in which:

FIGURE 1 is a sectional elevation of a horizontal rotary regenerative heat exchanger including a novel trunnion arrangement.

FIGURE 2 is an enlarged sectional view of a trunnion including the novel shielding and cooling arrangement.

FIGURE 3 is an enlarged sectional elevation of a modified form of shielding arrangement.

FIGURES 4 and 5 diagrammatically represent modified forms of shielding arrangement for use between the rotor housing and trunnion.

In the drawings a rotor post 12 having rotor trunnions 14 at opposite ends thereof is mounted in bearings 16 for rotation about a common longitudinal axis. A cylindrical rotor shell 15 concentric with the rotor post is joined thereto by radial partitions to form a series of sector-shaped compartments that are packed with a perforate mass of heat absorbent material 18 that permits streams of heating fluid and a fluid to be heated to pass axially therethrough.

The rotor is enclosed in a housing 20 having end plates 22 apertured at 24 and 26 and arranged to direct streams of hot gas and cooler air from ducts 28 and 30 to and through the heat absorbent material carried by the rotor. The rotor is rotated about its axis by a motor 31 that moves the compartments of heat absorbent material alternately between the hot gas and cooler air in order that heat from the gas may be transferred to the air through the intermediary of the heat absorbent material.

In accordance with the invention, a central passageway 32 is formed in the trunnion at either one or both ends of the rotor. The passageway terminates in a plenum chamber 34 at the end of the trunnion adjacent the rotor post and in a counter-bored duct 36 at its opposite end. A tubular member 38 is press fitted into passageway 32 to provide concentric axial passageways 32 and 36 at one end and the single passageway 32 at the opposite spaced end of the trunnion.

A tubular member or sheath 44 is formed to a configuration that lies in spaced relation to the outer surface of the trunnion to provide an annular chamber 46 therebetween. A series of radial passageways 48 connect the plenum chamber 34 with the annular chamber 46 while radial ducts 52 extend through the trunnion to interconnect the opposite end of the annular chamber 46 with the duct 36. By this arrangement fluid supplied to passageway 32 may flow through the plenum chamber 34 and radial passageways 48 to the annular chamber 36. The fluid then becomes a fluid shield protecting the outer surface of the trunnion until it reaches ducts 52 where it passes radially inward to duct 36 before being exhausted from the system.

Cooling fluid may be exhausted directly from the annular passageway 46 by the use of an exhaust manifold arrangement 50 as shown in FIGURE 3. This arrangement permits the exhaust of the heated fluid from the trunnion without the necessity of directing it back through the bearing and thus unnecessarily subjecting the bearing to heat absorbed by the fluid during its role as a coolant or heat shield.

Cooling fluid utilized in the arrangement herein defined thus performs a dual function of cooling the trunnion as it traverses passageway 32, and then shielding it from external heat as it flows through the annular passageway 46 surrounding the outer surface of the trunnion. As the cooling fluid reaches plenum chamber 34 and is directed outward through radial passageways 52 to the annular chamber 46, it also absorbs a large part of the heat from rotor post 12 before it can be conducted to the trunnion, thus shielding it from heat being conducted from the rotor post in a manner similar to that in which fluid flowing through annular passageway 46 shields the trunnion from heat being radiated thereto from an outside source.

An additional heat shield and seal 54 carried by the housing structure surrounds the trunnion and thus restricts the passage of radiant heat from the rotor to the bearing. The heat shield and seal includes an annular resilient sealing member 56 that abuts the periphery of the trunnion so as to permit limited misalignment of the trunnion and shield. An even greater degree of misalignment between the trunnion and the fixed housing structure may be permitted by replacing the rigid tubular shield 44 with a resilient housing 56 of the type shown in FIGURE 4 or 57 of FIGURE 5.

In FIGURE 4 the annular sealing member 56 radially abuts a wearing ring 58 that is secured to the resilient housing, while in FIGURE 5 the annular sealing member 62 is carried by the member 64 on the resilient housing 56 and is adapted to axially abut the heat shield 54. Thus the arrangement of FIGURE 4 provides for maximum axial mis-alignment between the trunnion and its heat shield, while the arrangement of FIGURE 5 provides for maximum mis-alignment in a radial direction. Because of the resiliency inherent in the housings 56 or 57, limited relative movement between either housing and its heat shield may be accommodated by a natural flexing of the housing without forcing a repositioning of the sealing means.

While this invention has been described with reference to the several embodiments illustrated in the drawing, it is evident that numerous changes may be made without departing from the spirit of the invention, and it is intended that all matter contained in the above description or shown in the accompanying drawing shall be interpreted as illustrative and not in a limiting sense.

I claim:

An arrangement for maintaining a low operating temperature in a rotor trunnion that supports rotary equipment for operation in a high temperature zone comprising a cylindrical rotor post, a trunnion in axial alignment with the rotor post secured thereto, shielding means surrounding the trunnion in evenly spaced relation to provide an annular chamber therebetween, a plenum chamber formed in said trunnion to confront the end of said rotor post, a first axial passageway extending through the trunnion to terminate in said plenum chamber, radial passageways in the end of the trunnion adjacent the rotor post extending between the plenum chamber and the annular flow passageway that surrounds the trunnion, a second axial passageway concentrically surrounding the end of said first fluid passageway remote from said plenum chamber, and duct means connecting the annular chamber and the second axial passageway in the trunnion to provide communication between the first and second axial passageways and the annular chamber therebetween.

References Cited in the file of this patent
UNITED STATES PATENTS

| | | |
|---|---|---|
| 2,936,158 | Ramundo | May 10, 1960 |
| 2,986,386 | Trimborn | May 30, 1961 |